W. B. KNAPP.
WINDOW SCREEN, CURTAIN, AND THE LIKE.
APPLICATION FILED MAR. 13, 1911.
1,068,780.
Patented July 29, 1913.
2 SHEETS—SHEET 2.
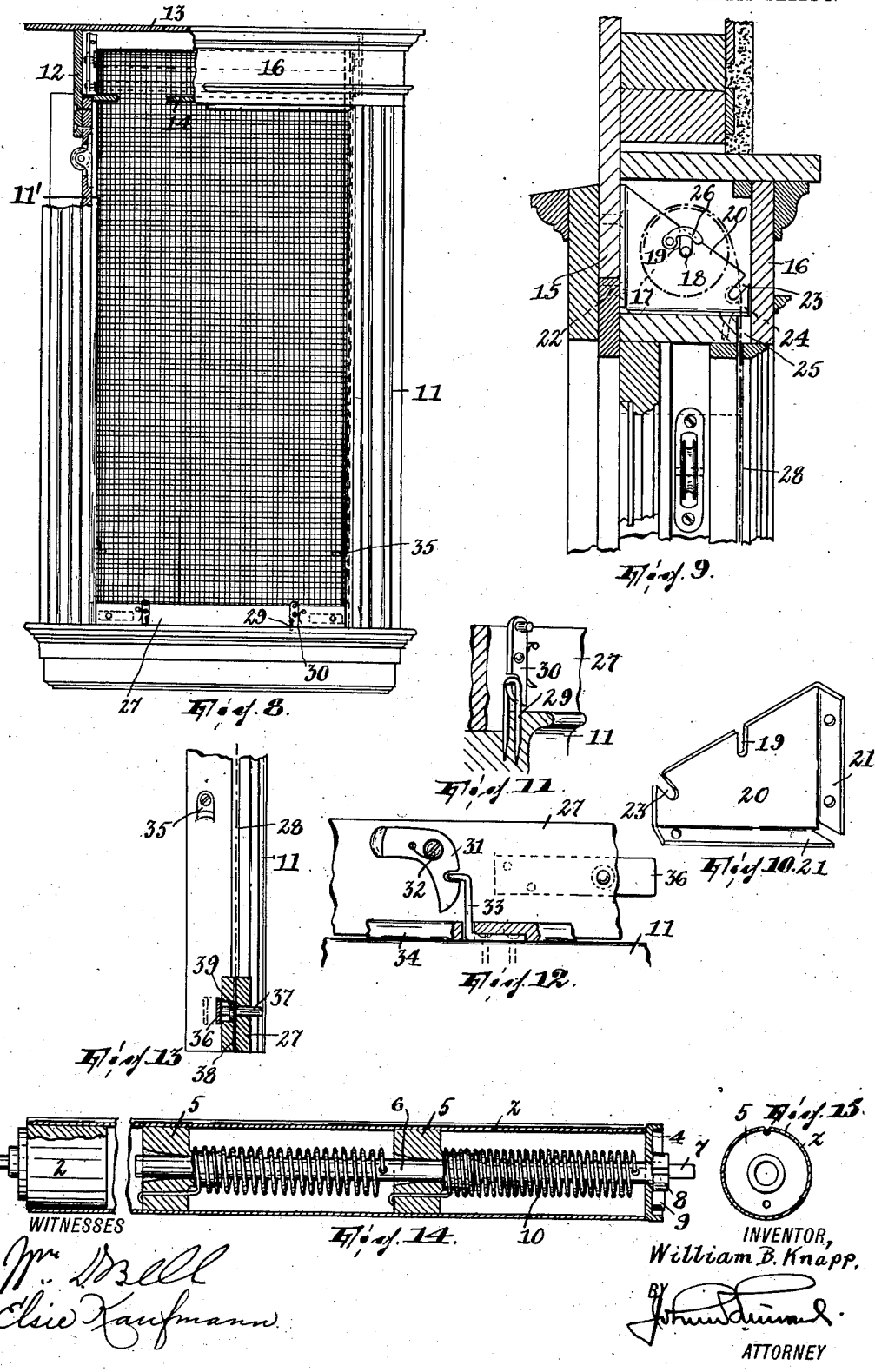
WITNESSES
INVENTOR,
William B. Knapp,
ATTORNEY

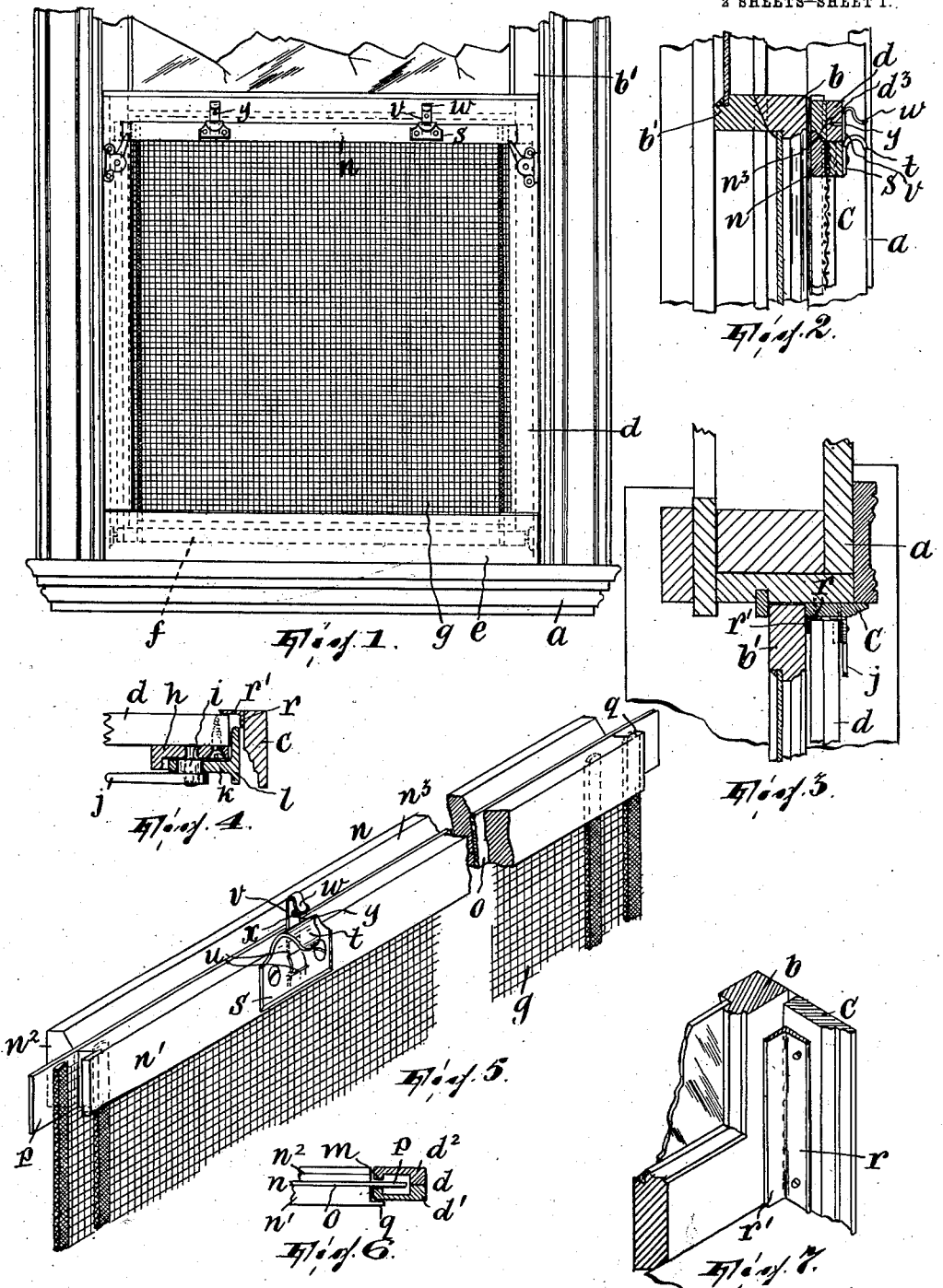

UNITED STATES PATENT OFFICE.

WILLIAM B. KNAPP, OF PATERSON, NEW JERSEY.

WINDOW SCREEN, CURTAIN, AND THE LIKE.

1,068,780.  Specification of Letters Patent.  Patented July 29, 1913.

Application filed March 13, 1911. Serial No. 613,990.

*To all whom it may concern:*

Be it known that I, WILLIAM B. KNAPP, a citizen of the United States, residing at Paterson, in the county of Passaic and State of New Jersey, have invented certain new and useful Improvements in Window Screens, Curtains, and the Like, of which the following is a specification.

My present invention relates to certain improvements in screens, curtains and the like appertaining to an invention forming the subject of Letters Patent No. 963,900, issued to me July 12th, 1910.

The objects aimed at and advantages secured by my said improvements will be readily understood by those skilled in the arts upon reference to the following specification in connection with the accompanying drawings, wherein, Figure 1 is an inside view of a window casing having my invention applied thereto; Fig. 2 is a vertical sectional view of that part of what is shown in Fig. 1 which immediately includes the meeting rails of the two sashes, the upper horizontal rail of the frame for the screen, and the upper part of the screen; Fig. 3 is a fragmentary horizontal sectional view taken just above one of the clamps shown in Fig. 1 for securing the improved screen structure in place; Fig. 4 shows, partly in section and on a larger scale, the clamp shown in Fig. 3: Fig. 5 is a fragmentary perspective view illustrating the structure of the screen proper and also showing an improved lift; Fig. 6 is a fragmentary horizontal sectional view showing the relation of parts of the screen proper to the frame in which the screen moves; Fig. 7 is a fragmentary perspective view illustrating the disposition of a certain angular strip; Fig. 8 is an inside view, partly in section, of a window casing provided with a modified form of my invention; Fig. 9 is a vertical sectional view of the upper portion of the casing shown in Fig. 8; Figs. 10 and 11 are perspective views illustrating details in Figs. 8 and 9; Fig. 12 is a view in elevation, partly in section, illustrating a modification of what is shown in Fig. 11; Fig. 13 is a vertical sectional fragmentary view of another detail appertaining to Fig. 8; and, Figs. 14 and 15 are longitudinal and cross-sectional views of an improved spring roller upon which the screen or curtain is wound.
$a$ designates the window casing, $b$ and $b'$ the lower and upper sashes, respectively, and $c$ the molding or inner stop bead.

$d$ is a rectangular frame which fits rather snugly between the stop beads $c$, the said frame being constructed substantially the same as in my patent aforesaid and comprising at the bottom a casing $e$ in which is journaled the spring roller $f$ on which is wound the screen or curtain $g$. The frame $d$ is removable from the casing $a$, but is normally held in place by two clamps secured to the inner adjoining face of the frame and adapted to bear against the stop beads $c$. Each clamp comprises a bracket $h$ in which is journaled a cam $i$ having a lever or handle $j$ and carrying a presser $k$ which terminates in a broad foot $l$ adapted to bear against the face of the stop bead $c$. The foot $l$ of the presser is extended outwardly as shown in Fig. 4 so as to reach between the frame $d$ and the molding $c$ of the casing $a$; thus the foot $l$ of the presser acquires an ample purchase on the casing although the surface of the latter which is impinged by said foot may be beveled forward as is the case with the molding $c$ in Fig. 4. In securing the frame in place the handles $j$ are turned in one direction to force each foot $l$ into contact with the stop bead; upon turning the handles in the opposite direction the clamping action will be relieved, so that the frame may be removed.

The sides of the frame $d$, as in my patented construction, comprise two strips $d'$ and $d^2$ (Fig. 6) and said sides have opposed vertical grooves $m$ which receive the edges of the screen or curtain $g$. The free edge of the screen or curtain is held in a cross-piece $n$, comprising two strips $n'$ and $n^2$ between which said edge of the screen is received, together with a flat metallic reinforcing strip $o$ whose ends project from the ends of the cross-piece to form fins $p$. These fins are received by the grooves $m$ in the sides of the frame $d$, and to insure a smooth and accurate yet snug working of the cross-piece with respect to said sides, the strip $n'$ has projections $q$ at its ends which overlap the sides of the frame $d$ (Fig. 6). Further, to insure a closed and nicely fitting joint between the cross-piece $n$ and the upper horizontal rail of the frame $d$, the said rail and cross-piece $n$ have the beveled coacting lips $d^3$ and $n^3$ (Fig. 2).

In order to close off any possible openings between the sides of the frame $d$ and casing $a$, a thin strip $r$ (Fig. 7), angular in cross-section, is fitted in the angle between each stop bead $c$ and the sash $b$, being secured to the stop bead. When the frame $d$ is properly clamped in place, it abuts against the projecting wall $r'$ of this strip $r$, so that possible openings are closed.

Figs. 1, 2 and 5 show my improved lift. $s$ is a plate having a bent-off extension $t$ forming a finger grip, the said plate constituting the lift-proper. The plate is provided with two horizontal slits $u$ through which is passed a plate spring $v$ having its upper end bent over to form a thumb-piece $w$, the said plate-spring having a hole $x$ to receive a pin $y$ projecting from the top rail of the frame $d$. By gripping the portion $t$ of the lift with the forefinger and pressing down with the thumb on the thumb-piece $w$, the latter is released from the pin $y$, allowing the screen or curtain to be lowered.

In Figs. 14 and 15 I have shown a spring roller the construction of which allows its spring-resistance to be changed according to the length of the roller and width of the curtain or screen, and hence to suit the weight represented by the curtain or screen. In one end of the cylindrical shell $z$ is fixed the usual plug 2 carrying the "dead" trunnion 3, while at the other end of said shell is fixed the head 4 in which and the bearings 5, 5, is journaled the shaft 6 which projects through the head 4 to form the "live" trunnion 7 and carries the ratchet 8 with which coöperates in the usual manner the pawl 9. The heads 5 are fixed in the shell and to each of them is attached one end of a spring 10 which is coiled about the shaft 6 and has its other end fixed to the shaft. Thus, instead of employing a single spring, as is usual, two or more springs 10 are utilized, the tensile strength of each of which is of course considerably greater than would be the tensile strength of a spring whose length approximates the combined lengths of the springs 10.

In Figs. 8 and 9 to the sides 11' of the casing 11 are secured the end walls 12 of a box or casing for the roller which in the present instance is disposed at the top of the window casing, the screen or curtain pulling downwardly instead of upwardly; the top and bottom walls of this casing are marked 13 and 14, respectively, and its back and front walls 15 and 16, respectively. The roller 17 has its trunnions 18 journaled in notches 19 in two sheet metal plates 20 each having two flanges 21 disposed in planes at right angles to each other and secured to the walls 14 and 15 by the screws 22. Other notches 23 are formed in the plates to receive a guiding roller 24 which serves to prevent the screen from rubbing against the surfaces of the slot 25 in the wall 14 through which it passes downwardly, as when the wound body of material on the roller reduces in diameter when the screen is extended. 26 designates keepers to retain the trunnions 18 in their bearings. The cross-piece 27 may be substantially the same in construction as the cross-piece already described, its ends and the side edges of the screen being guided in the grooves 28 which, in this case, may be formed directly in the window casing 11, instead of in a removable frame for the screen. To the sill of the window casing may be attached staples 29 with which may interlock spring-latches 30 carried by the cross-piece 27 to hold the screen down (in the closed position). A better construction, however, is that shown in Fig. 12 where the spring actuated latch 31 pivoted on the pin 32 on the cross-piece 27, is adapted to interlock with a Z-shaped anchor-piece 33 secured to the sill and projecting through the molding 34 on the sill.

It sometimes becomes desirable that the screen should be arranged to expose a small opening. To this end, concave stops 35 are secured to the opposed faces of the window casing and to the outer face of the cross-piece at each end thereof is secured a plate-spring 36 against which bears a button 37 guided in the cross-piece and the fin 38 which guides the cross-piece in groove 28, the button having a head 39 which holds it against inward displacement out of the cross-piece. Upon releasing the latches and then pressing inwardly on the buttons 37, the ends of the plate springs 36 may be brought into alinement with the stops 35 so as to engage therewith and hold the screen against being drawn up by its spring-roller past the limit represented by said stops.

Having thus fully described my invention, what I claim as new and desire to secure by Letters Patent is:—

1. The combination of a frame having parallel sides formed with opposite vertical grooves, a horizontal roller journaled in said frame, a fabric wound on said roller and having its side edges received by said grooves, and a horizontal cross-piece secured to the free horizontal edge of said fabric and having a flat reinforcing strip extending throughout the same and projecting at each end thereof and forming a fin entering the corresponding groove, said cross-piece having also a projection parallel with said fin and overlapping and bearing against one face of the corresponding side of the frame, substantially as described.

2. The combination of a frame having parallel sides formed with opposite vertical grooves, a horizontal roller journaled in said frame, said frame having a rail parallel with said roller, a fabric wound on said roller and having its side edges received by said grooves, and a horizontal cross-piece secured to the free edge of said fabric, and having its ends guided in said grooves, the adjoining portions of said rail and cross-piece having for their entire length mating beveled lips adapted to overlap each other when said cross-piece abuts against the rail, substantially as described.

3. The combination, with the window casing and a sash movable vertically therein, of an open rectangular frame fitted in the casing and lying in close relation to and parallel with the inner face of the sash, a horizontal roller journaled in said frame adjacent one of its horizontal portions, a fabric wound on said roller and adapted when unwound to extend to the other horizontal portion of said frame, means for securing said frame removably in position, and cross-sectionally angular strips respectively fitted in the angles between the sash and the sides of the casing and each having one wall thereof overlapping the adjoining side of said frame, substantially as described.

4. The combination of a frame having parallel sides formed with opposite vertical grooves, a horizontal roller journaled in said frame, a fabric wound on said roller, and a horizontal cross-piece secured to the free horizontal edge of said fabric and comprising flat strips $n'$ $n^2$ and a flat reinforcing strip $o$ interposed between the strips $n'$ $n^2$ and having its ends projecting beyond the ends of the latter strips and entering said grooves, substantially as described.

In testimony whereof I affix my signature in presence of two witnesses.

WILLIAM B. KNAPP.

Witnesses:
JOHN W. STEWARD,
WM. D. BELL.